(12) United States Patent
Dallan

(10) Patent No.: US 12,128,513 B2
(45) Date of Patent: Oct. 29, 2024

(54) LINE FOR PRODUCING METAL PROFILES FOR PLASTERBOARD FALSE CEILINGS

(71) Applicant: DALLAN S.p.A., Castelfranco Veneto (IT)

(72) Inventor: Andrea Dallan, Castelfranco Veneto (IT)

(73) Assignee: DALLAN S.p.A., Castelfranco Veneto (IT)

( * ) Notice: Subject to any disclaimer, the term of this patent is extended or adjusted under 35 U.S.C. 154(b) by 0 days.

(21) Appl. No.: 18/392,859

(22) Filed: Dec. 21, 2023

(65) Prior Publication Data
US 2024/0217040 A1 Jul. 4, 2024

(30) Foreign Application Priority Data
Dec. 28, 2022 (IT) .......................... 102022000027021

(51) Int. Cl.
*B23P 23/06* (2006.01)
*B21D 28/26* (2006.01)
*E04B 9/06* (2006.01)

(52) U.S. Cl.
CPC .............. *B23P 23/06* (2013.01); *B21D 28/26* (2013.01); *E04B 9/067* (2013.01)

(58) Field of Classification Search
CPC ........... Y10T 29/5196; Y10T 29/49627; Y10T 29/52; Y10T 29/53313; Y10T 29/53365; Y10T 29/53383; Y10T 29/53417; B21D 28/26; B23P 23/06; B23P 19/00; B23P 19/008; B23P 21/004
See application file for complete search history.

(56) References Cited

U.S. PATENT DOCUMENTS

| 6,925,707 | B1 | 8/2005 | Dallan | |
|---|---|---|---|---|
| 7,207,201 | B1 * | 4/2007 | Chuang | B21D 28/26 72/181 |
| 11,014,137 | B2 * | 5/2021 | Huang | B21D 22/022 |

(Continued)

FOREIGN PATENT DOCUMENTS

| CA | 2315816 A1 | 4/2000 |
|---|---|---|
| IT | 201800004328 A1 | 10/2019 |

OTHER PUBLICATIONS

Search Report for 2022000027021 dated Jun. 27, 2023, Munich, DE.

*Primary Examiner* — Jason L Vaughan
(74) *Attorney, Agent, or Firm* — ArentFox Schiff LLP; Michael Fainberg

(57) ABSTRACT

A line for producing metal profiles for plasterboard false ceilings has a profiling machine, a cutting group, a punching group, an extraction system for extracting finished metal profiles from the punching group, and a management and control unit. The punching group has a first punching press of the portal type having an elongated punching head along a first operating direction and a plurality of second punching presses arranged downstream of the first punching press and aligned with each other to form a row along a second operating direction. The management and control unit is configured so as to alternatively operate in use the first punching press and at least one part of the second punching presses as a function of type or length of the metal profiles in output from the cutting group. The extraction system, is integrated with the second punching presses, and has a conveyor belt.

21 Claims, 6 Drawing Sheets

(56) References Cited

U.S. PATENT DOCUMENTS

| | | | | |
|---|---|---|---|---|
| 2006/0075869 A1* | 4/2006 | Calcei | ............ | E06B 3/67365 83/72 |
| 2007/0125038 A1* | 6/2007 | Lehane | ............ | E04B 9/068 52/506.07 |
| 2012/0234064 A1* | 9/2012 | Wiedner | ............ | B21H 8/00 72/177 |
| 2012/0291388 A1* | 11/2012 | Lehane, Jr. | ............ | B21D 22/02 52/506.07 |
| 2013/0167476 A1* | 7/2013 | Anderson | ............ | B21D 47/02 72/476 |
| 2015/0128422 A1* | 5/2015 | Rasmussen | ............ | E04D 1/265 29/897.32 |
| 2018/0305782 A1* | 10/2018 | Seyr | ............ | B21D 5/08 |
| 2019/0070651 A1* | 3/2019 | Fortmeier | ............ | B62D 29/008 |
| 2021/0156000 A1* | 5/2021 | Tomitz | ............ | C21D 9/46 |
| 2022/0381084 A1 | 12/2022 | Dallan | | |

* cited by examiner

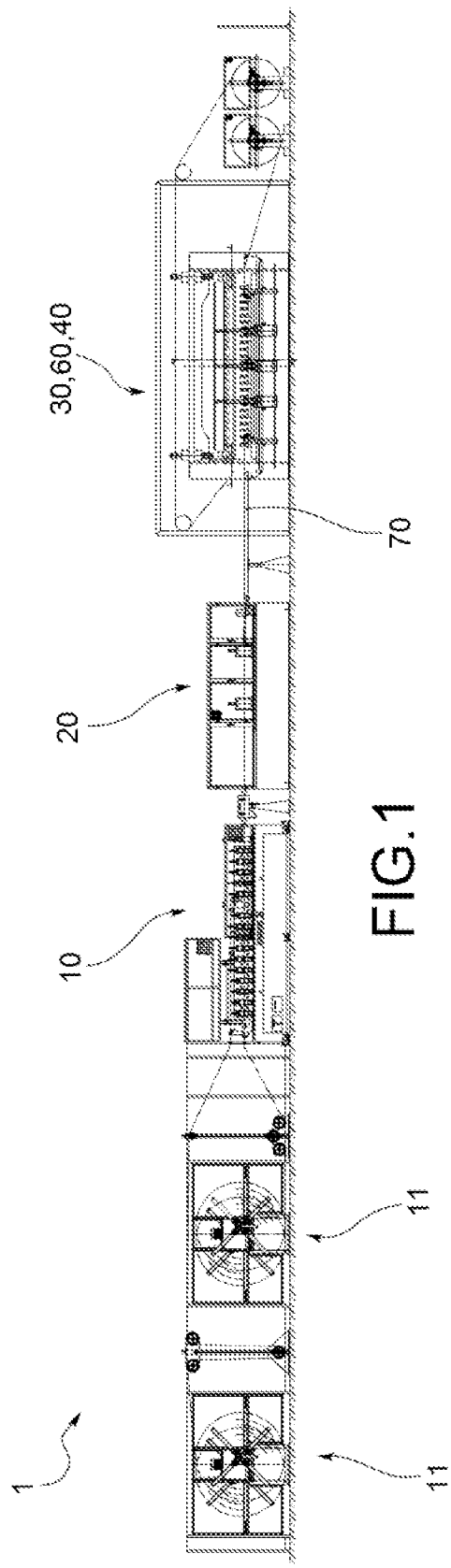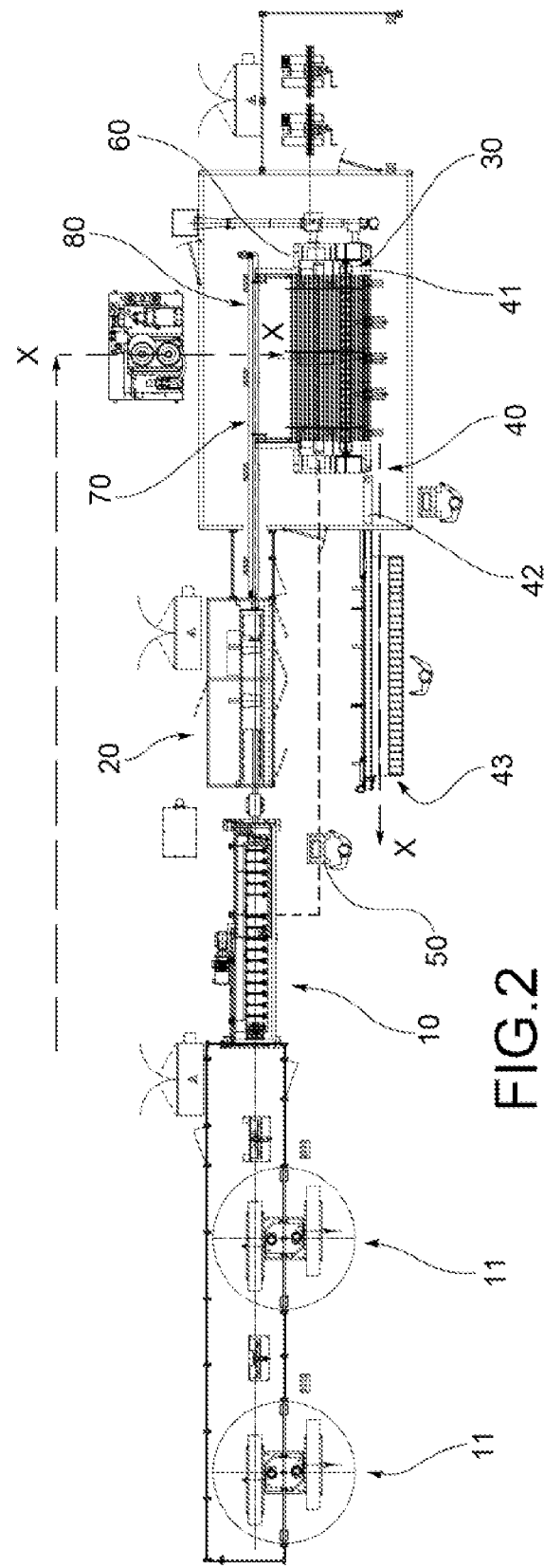

LINE FOR PRODUCING METAL PROFILES FOR PLASTERBOARD FALSE CEILINGS

CROSS REFERENCE TO RELATED APPLICATION

This application claims priority to and benefit of Italian Patent Application No. 102022000027021 filed Dec. 28, 2022, the contents of which are incorporated by reference in their entirety.

FIELD OF THE INVENTION

The object of the present invention is a line for producing metal profiles for plasterboard false ceilings.

The line according to the invention allows for the production of metal profiles of various lengths whilst simplifying their production from a plant engineering point of view.

BACKGROUND OF THE INVENTION

As is known, false ceilings comprise a frame to which plasterboard panels are fastened. In turn, the frame comprises a grid of metal profiles that are connected to one another.

One particularly diffuse false ceiling solution envisages the construction of frames using T section metal profiles.

More specifically, the frame comprises:
- a plurality of main profiles (called main runners in jargon) which are produced with a standard length (typically 3600 mm); and
- a plurality of secondary profiles (called cross T in jargon) which are generally produced in two different lengths, typically 1200 mm and 600 mm.

The main profiles are arranged parallel to one another and form the main carcass of the frame. The longer secondary profiles (1200 mm) connect the main profiles to one another and are always used in the construction of a frame; the shorter secondary profiles (600 mm) connect the longer length secondary profiles to one another and are used in the construction of a frame only for grid meshes of reduced dimensions.

Generally, both the main profiles and the secondary profiles are provided at the ends thereof with coupling terminals intended to engage with appropriate holes located within the profiles themselves along the longitudinal extension thereof, so as to allow for the rapid assembly of the frame.

The main profiles and the secondary profiles may be differentiated therebetween not only by the length and the number of holes but optionally also by the height of the profile (greater for the main profiles) and by the coupling terminals.

For this reason, operationally, separate production lines are provided: a production line dedicated to the production of main profiles; and a production line dedicated to the production of secondary profiles.

Typically, a production line for metal profiles with a T cross-section (both for main profiles and for secondary profiles) comprises the following operating stations:
- one or two metal strip winding reels;
- a profiling machine suitable for profiling the metal strip in order to obtain a continuous metal profile;
- a cutting group arranged downstream of the profiling machine suitable for cutting said continuous metal profile into pieces of predefined lengths which constitute the metal profiles;
- optionally, downstream of the cutting group, a group for the application of coupling terminals to both ends of each of the aforesaid metal profiles, supplied with a metal strip by means of one or more winding reels;
- a punching group that comprises a press and that is suitable for producing appropriate holes along the longitudinal extension of each single metal profile, generally arranged downstream of the group for the application of terminals; and
- a system for extracting finished metal profiles from the punching group.

In the production of the main and secondary metal profiles, one of the most important differentiating operating points is the punching group. In fact, due to the different lengths and different numbers of holes to be made, presses with different mechanical and operating features are necessary. Typically, the punching of the main metal profiles is performed using a press with a production speed of 27 pieces/minute, whilst the punching of the secondary metal profiles is performed using a smaller but faster press that is able to ensure a higher production speed (typically 40 pieces/minute).

Operationally, the larger press may also be used for the punching of secondary metal profiles. However, the production speed would be excessively low, taking into account the fact that the secondary metal profiles generally represent about 75% of production.

To concentrate, therefore, on a single line the production of main metal profiles and of secondary metal profiles would excessively penalize the production speed of the secondary metal profiles. For this reason, production management using two separate lines continues, accepting the higher installation costs related to this operating choice.

Today, with a view to reducing plant costs there still continues to be a great need for a production line that is capable of producing both types of metal profiles without limiting the production speed of the secondary metal profiles.

To date, however, this need remains unsatisfied.

SUMMARY OF THE INVENTION

Consequently, the main object of the present invention is that of eliminating, either completely or in part, the disadvantages of the aforementioned state of the art and making available a line for producing metal profiles for plasterboard false ceilings that is capable of producing both types of metal profiles without limiting the production speed of the secondary metal profiles.

A further object of the present invention is that of providing a line for producing metal profiles for plasterboard false ceilings that it is operationally simple to control.

A further object of the present invention is that of providing a line for producing metal profiles for plasterboard false ceilings with manufacturing costs that are comparable to traditional apparatuses.

BRIEF DESCRIPTION OF THE DRAWINGS

The technical features of the present invention, according to the aforesaid objects, may be clearly seen in the contents of the claims below, and its advantages will become more readily apparent in the detailed description that follows, made with reference to the accompanying drawings, which represent one or more purely exemplifying and non-limiting embodiments thereof, wherein:

FIG. 1 shows an orthogonal elevation view of a line for producing metal profiles for plasterboard false ceilings according to one preferred embodiment of the present invention;

FIG. 2 shows an orthogonal view from above of the line of FIG. 1;

DETAILED DESCRIPTION

Figure 3:
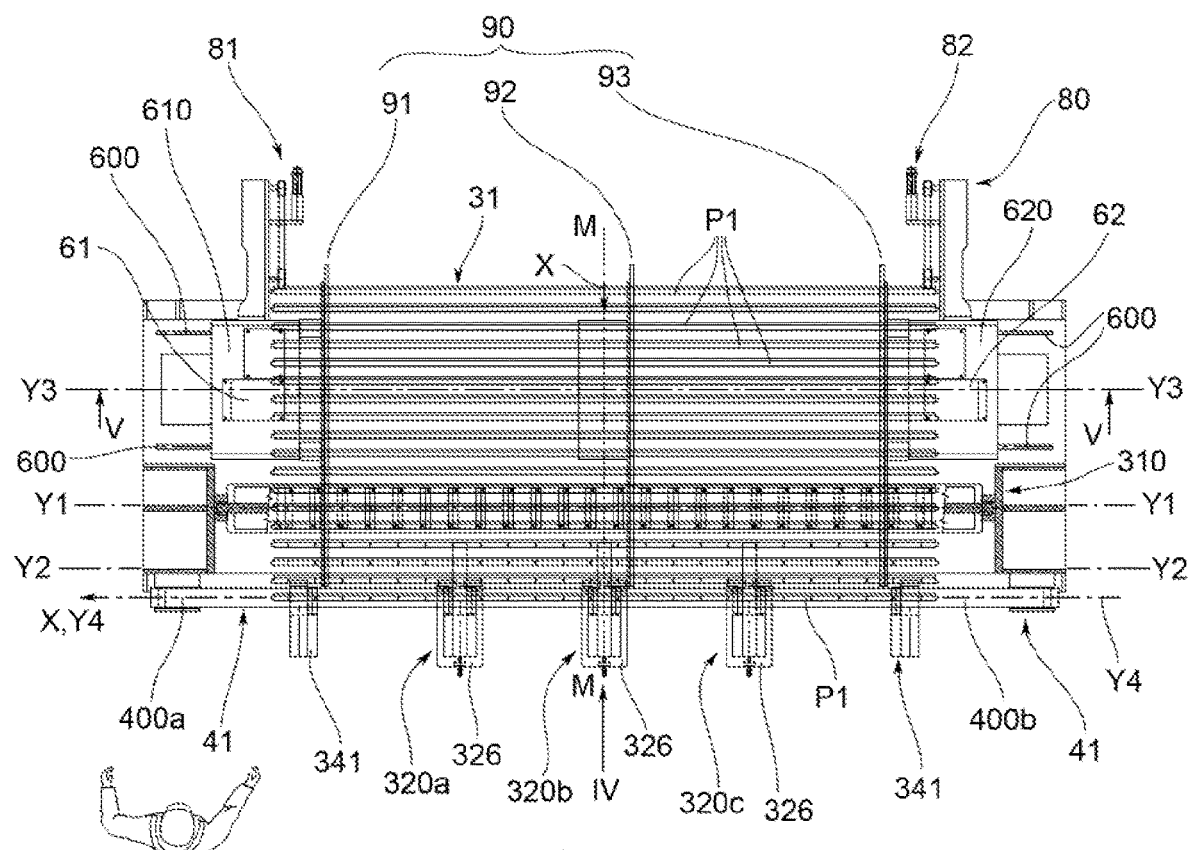
FIG. 3 shows an enlarged view of part of the line of FIG. 2 in relation to a group for the application of coupling terminals and a punching group comprising a first punching press and a plurality of punching presses with a rear C-support, which are movable and aligned with each other to form a row, wherein said production line is shown (with some parts removed to better illustrate others) in an operating configuration that is suitable for the production of main metal profiles that involves the operation of the first punching press only.

The line for producing metal profiles for plasterboard false ceilings according to the present invention is indicated in the entirety thereof with the numeral 1 in the attached figures.

Here and in the rest of the description and in the claims, reference will be made to the line 1 under usage conditions. Therefore, any references to a lower or upper position or to a horizontal or vertical orientation should be interpreted in this sense.

According to one general embodiment of the present invention, as shown in FIG. 1, the line 1 comprises, in sequence, along a profile advancement direction X:
- a profiling machine 10;
- a cutting group 20;
- a punching group 30; and
- an extraction system 40 for extracting finished metal profiles P1, P2 from the punching group 30.

As shown in FIG. 2, the advancement direction X of the profiles may follow a broken straight line path. In particular, within some sections said advancement direction X is parallel to the longitudinal extension direction of the profiles (see the section along the profiling machine 10 and the cutting group 20 or the section corresponding to the profile extraction system), whilst in other sections said advancement direction X is orthogonal to the longitudinal extension direction of the profiles (see the section along the punching group 30).

The profiling machine 10 is suitable for profiling a metal strip to obtain a continuous metal profile having a predefined transverse cross-section. Preferably, the transverse section is T-shaped.

In particular, the profiling machine 10 is supplied upstream by at least one metal strip reel supported by a winder 11. The profiling machine 10 may be of any type and will not be described in further detail insofar as it is known by a person skilled in the art.

The cutting group 20, arranged downstream of the profiling machine 10, is suitable for cutting the continuous metal profile into pieces of predefined lengths which constitute the metal profiles P for plasterboard false ceilings. In particular, the cutting group 20 may be controlled by means of the management and control unit 50 in order to automatically adjust the length of the pieces cut (profiles).

In particular, the cutting group 20 may be controlled so as to cut pieces of a predefined length corresponding to:
- main metal profiles P1, having for example a typical length of 3600 mm;
- secondary metal profiles P2 of a greater length, having for example a typical length of 1200 mm; and
- secondary metal profiles P3 of a shorter length, having for example a typical length of 600 mm.

The cutting group 20 may be of any type and will not be described in further detail insofar as it is known by a person skilled in the art.

The punching group 30 is arranged downstream of the cutting group 20 and is suitable for making holes on each metal profile P1, P2, P3 along the longitudinal extension of the latter. In particular, the punching group 30 is installed within a profile movement lane 31, which will be better described hereinafter.

The extraction system 40 is suitable for extracting the profiles from the punching group 30. In particular, the extraction system 40 is located at the end of the aforementioned profile movement lane 31.

The line 1 comprises, furthermore, a management and control unit 50 that is preferably provided with a control interface. The management and control unit 50 is suitable for controlling at least one cutting group 20 and said punching group 30.

Preferably, as shown in FIG. 2, the line 1 comprises, furthermore:

a conveyor 70 for transferring the metal profiles P1, P2, P3 from said cutting group 20 to said punching group 30, said conveyor 70 being configured to move the metal profiles P1, P2, P3 parallel to the longitudinal extension direction thereof;

a profile transfer device 80 for transferring the profiles P1, P2, P3 that is suitable for picking up the metal profiles from said conveyor 70 and inserting them into the punching group 30, arranging them so that the longitudinal extension axis is parallel to the advancement direction X; and a profile movement device 90 which is suitable for making the profiles advance starting from the profile transfer device 80 to the extraction system 40 inside a profile movement lane 31—through the punching group 30—with a direction orthogonal to the longitudinal extension axis of the metal profiles.

The term profile movement lane 31 refers to the space equipped for profile handling that extends from the profile transfer device 80 to the extraction system 40.

In particular, the profile movement device 90 is suitable for making the profiles advance through the punching group with a direction orthogonal to a first and second operating direction Y1, Y2, which will be defined further on.

In particular, the profile movement device 90 is suitable for moving the metal profiles P1, P2, P3 along said profile movement lane 31.

The conveyor 70 may be of any type and will not be described in further detail insofar as it is known by a person skilled in the art. Preferably, the conveyor 70 is defined by a conveyor belt or by a motorized roller.

Advantageously, the conveyor 70 is provided with a mechanical stop 71 wherein the position thereof is adjustable along the advancement direction X. Operationally, the mechanical stop 71 is adjusted in position so as to arrange the metal profiles P1, P2, P3 centered lengthwise along the centerline M-M of the profile movement lane 31.

The profile transfer device 80 may be of any type and will not be described in further detail insofar as it is known by a person skilled in the art.

In particular, the profile transfer device 80 may comprise two pushers 81, 82 that are configured to laterally push one profile at a time from the conveyor belt 70 towards the punching group 30 within the aforementioned profile movement lane 31 as the profiles reach the profile transfer device 80. The two pushers 81, 82 are moveable in parallel to the conveyor belt 70 in order to adapt themselves to the length of the profiles and to center themselves in turn in relation to the centerline M-M of the profile movement lane 31.

Preferably, the profile movement device 90 may be of any type and will not be described in further detail insofar as it is known by a person skilled in the art. In particular, the profile movement device 90 is defined by a plurality of combs 91, 92, 93 parallel to each other and to the advancement direction X. Each comb extends substantially in length from the profile transfer device 80 up to the extraction system 40 and is cyclically movable so as to impart to each individual profile a stepwise advancing movement.

Advantageously, the combs are distributed over the width (a dimension transverse to the advancement direction X) of the profile movement lane 31 and are movable orthogonally to the advancement direction X so that it is possible to adjust the distribution thereof within the metal lane 31 as a function of the type of metal profiles treated.

Advantageously, as shown in FIG. 2, the line 1 comprises, furthermore, downstream of the cutting group 20, a group for the application of coupling terminals 60 which is suitable for applying coupling terminals to both ends of each of the metal profiles.

Preferably, the group for the application of coupling terminals 60 is arranged upstream of the punching group 30 and downstream of the profile transfer device 80 and is integrated into said profile movement device 90. Operationally, similarly to what occurs in the punching group 30, the metal profiles P1, P2 are caused to advance within the group for the application of coupling terminals 60 by means of said profile movement device 90.

In other words, the group for the application of coupling terminals 60 is arranged within the profile movement lane 31.

Advantageously, as shown in particular in FIGS. 3, 5, 7, 9 and 11, the group for the application of coupling terminals 60 comprises two coupling terminal application heads 61, 62 which are aligned along a coupling terminal application direction Y3, parallel to the longitudinal extension direction of the profiles and orthogonal to the advancement direction X of the profiles themselves.

In particular, the coupling terminal application direction Y3 is parallel to a first operating direction Y1 and a second operating direction Y2, which will be defined further on.

Operationally, said two application heads 61, 62 are movable along said coupling terminal application direction in order to adapt themselves to the length of the metal profiles P1, P2, P3 to be processed.

In more detail, said coupling terminal application heads 61, 62 are mounted on motorized carriages 610, 620 sliding on guides 600 parallel to said coupling terminal application direction Y3. Said management and control unit 50 is configured so as to operate in use said motorized carriages 610, 620 with the aim of adjusting the position of said two application heads 61, 62 along said coupling terminal application direction Y3 as a function of the type or length of the metal profiles P1, P2, P3 in output from the cutting group 20.

Operationally, the two application heads 61, 62 are moved while holding themselves equidistant from the centerline M-M of the profile movement lane 31.

According to a first aspect of the present invention, said punching group 30 comprises:

a first portal-type punching press 310 having an elongated punching head 311 along a first operating direction Y1; and a plurality of second punching presses with a C-support 320a, 320b, 320c, which are arranged downstream of said first punching press 310 and are aligned with each other to form a row along a second operating direction Y2 parallel to the first operating direction Y1.

Each of said second punching presses 320a, 320b, 320c has a relevant punching head 321a, 321b, 321c extending in length along the second operating direction Y2 for a fraction of the length of the elongated punching head 311 of said first punching press 310.

Figure 6:
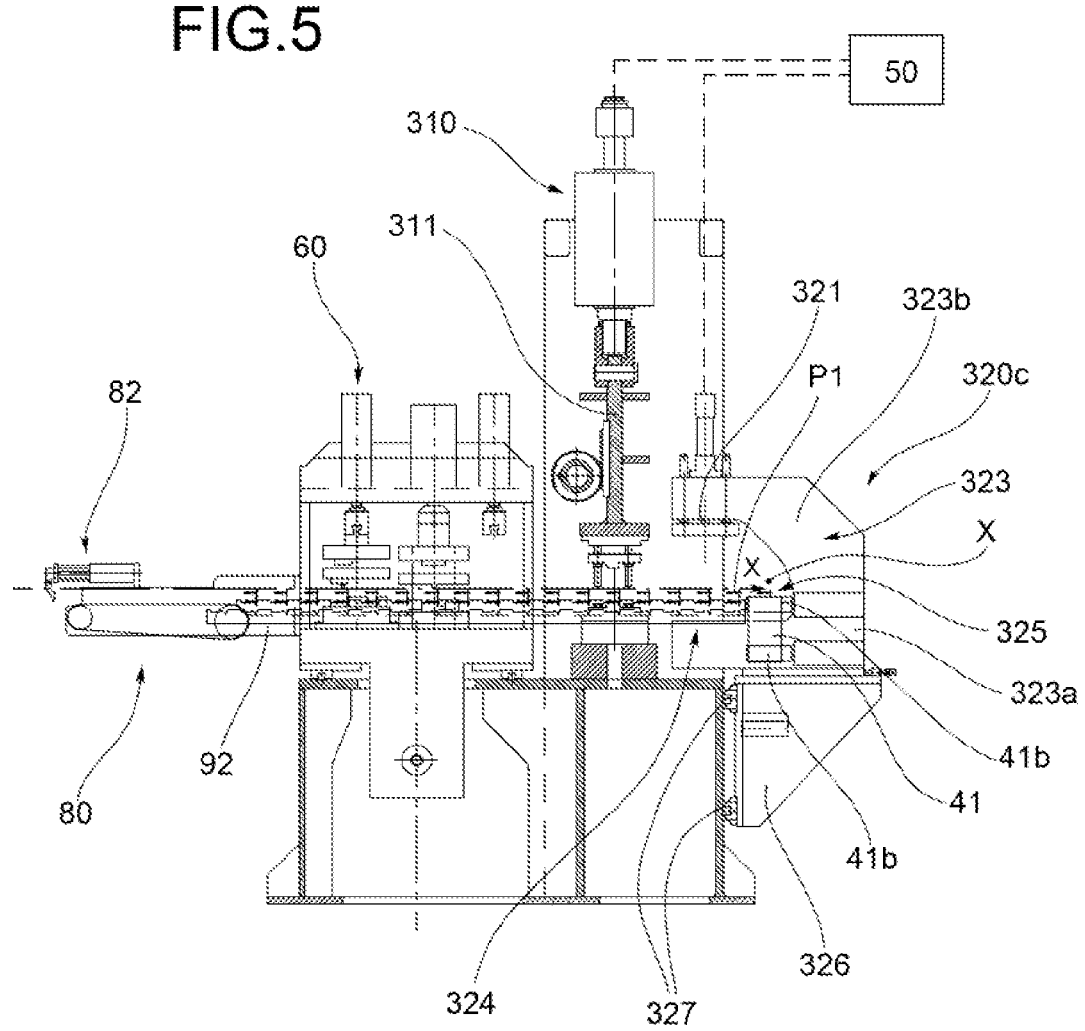
FIG. 6 shows an orthogonal elevation view of the group for the application of coupling terminals and of the punching group depicted in FIG. 3 according to the cross-section line VI-VI depicted in FIG. 4.
Figure 10:
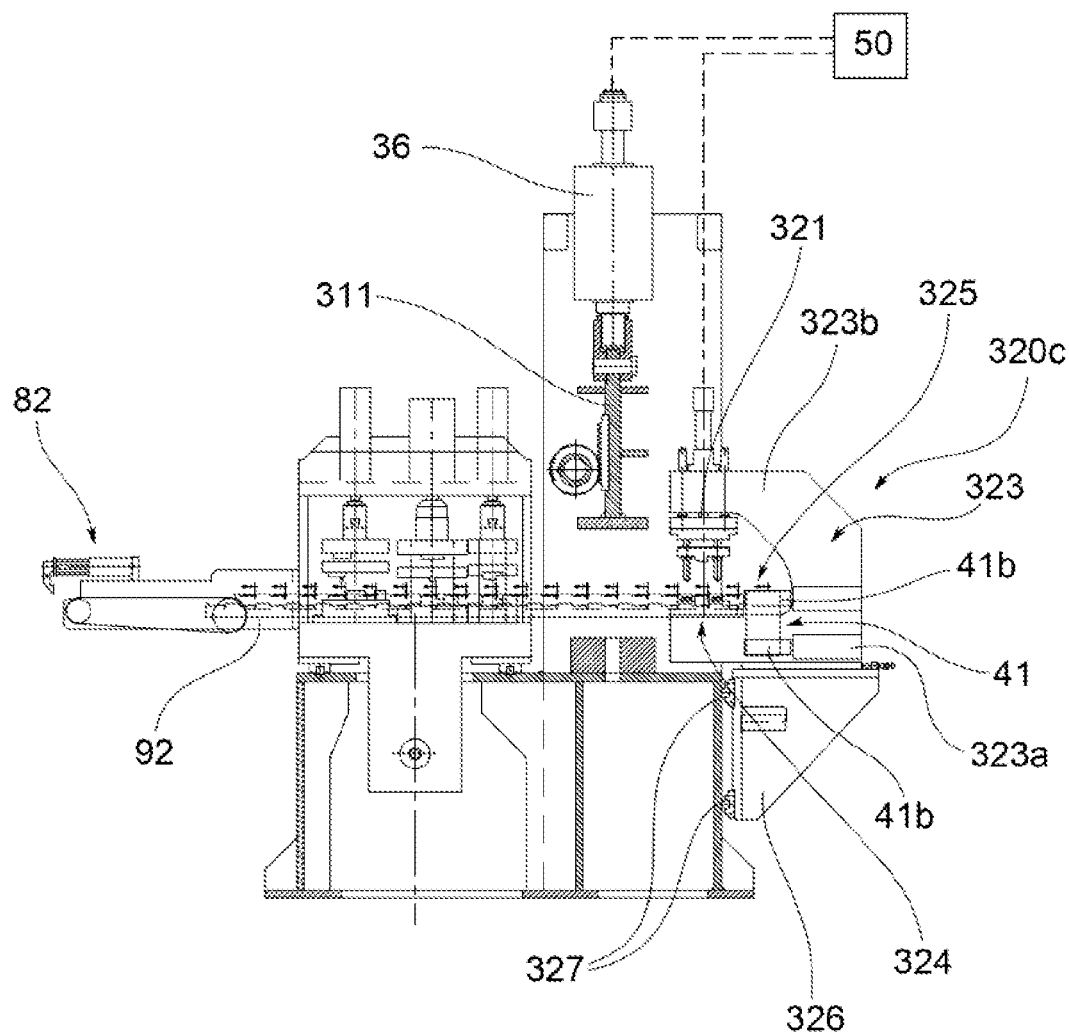
FIG. 10 shows a cross-section orthogonal elevation view of the group for the application of coupling terminals and of the punching group depicted in FIG. 7 according to the cross-section line X-X shown in FIG. 8.
Figure 11:
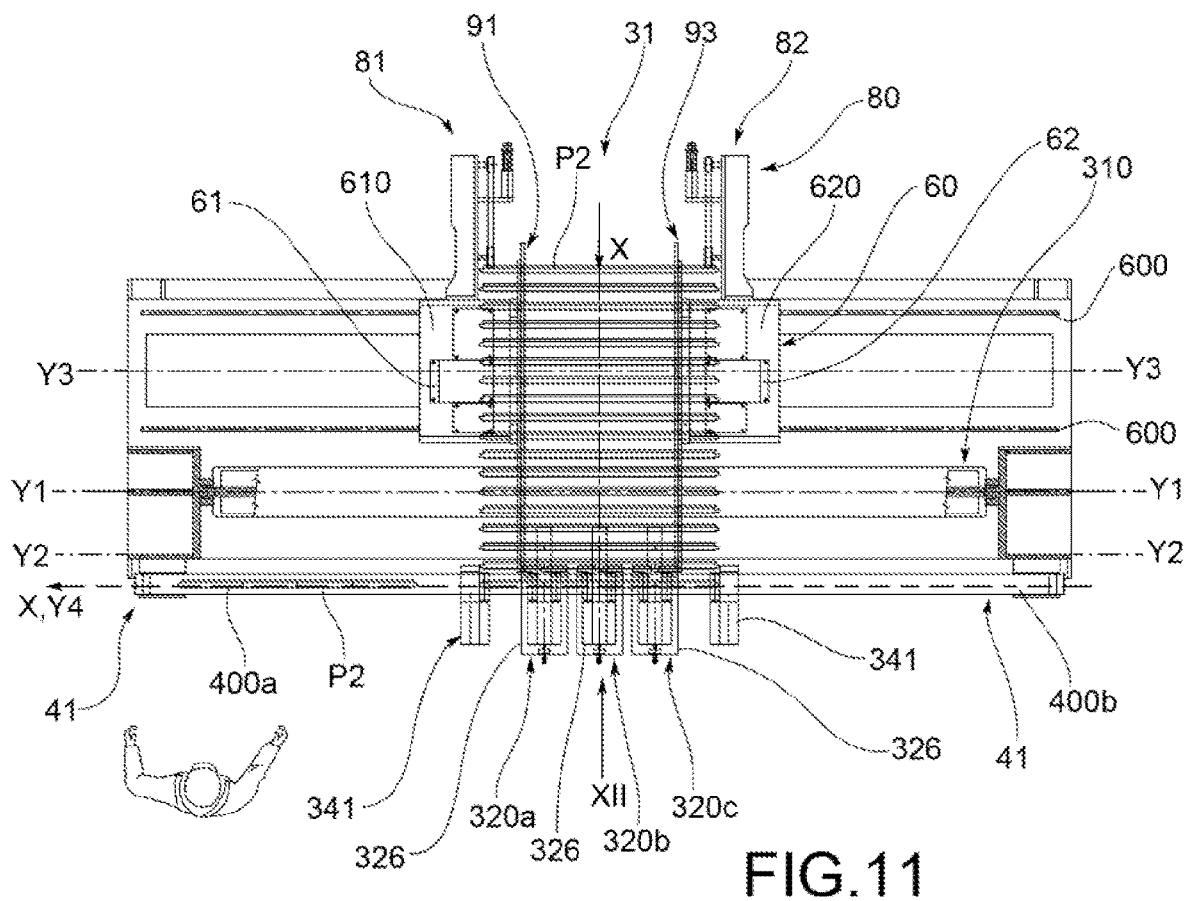
FIG. 11 shows an enlarged view of part of the line of FIG. 2 in relation to a group for the application of coupling terminals and a punching group comprising a first punching press of the portal type and a plurality of punching presses with a C-support, which are movable and aligned with each other to form a row, wherein said production line is depicted in an operating configuration that is suitable for the production of secondary metal profiles having a second predefined length that is greater than the first.

As may be observed in FIGS. 6 and 10, in each of said second punching presses the relevant C-support 323 comprises a support base 323a and an arm 323b extending cantilevered from said support base 323a to support at a free end thereof the punching head 321a, 321b, 321c above an abutment area 324 obtained on said support base 323a. Between said abutment area 324 and the arm 323b, upon said support base 323a, a profile unloading area 325 is delimited, which is not affected by the movement of the punching head.

The management and control unit 50 is configured so as to alternatively operate in use said first punching press 310 and at least one part of said second punching presses 320a, 320b, 320c as a function of the type or length of the metal profiles P1, P2, P3 in output from the cutting group 20.

According to a further aspect of the invention, the system 40 for extracting the finished metal profiles P1, P2, P3 from the punching group is integrated with said second punching presses 320 a, 320b, 320c and comprises a conveyor belt 41.

Said conveyor belt 41 is arranged so as to define a profile sliding plane m along an extraction direction Y4 which is parallel to said second operating direction Y2 and passes through the respective unloading areas 325 of the second punching presses, so as to allow the extraction of the profiles themselves laterally to said punching group 30 at said second punching presses.

By virtue of the present invention it is therefore possible to size the first punching press 310 and the second punching presses 320a, 320b, 320c in a differentiated manner as a function of the type of metal profile that is to be treated. In other words, by virtue of the fact that the first punching press 310 may be dedicated to a particular type of metal profile (main profiles P1), whilst the second punching presses 320a, 320b, 320c may be dedicated to a different type of metal profile (secondary profiles P1, P2), it is possible to optimize the functioning thereof in view of the operating efficiency of the production line 1. In particular, it is possible to size, in an optimal manner, each press as a function of the production speed of the metal profile to be processed. In more detail, the second punching presses 320a, 320b, 320c (of reduced dimensions in relation to the first punching press 310) may be sized so as to ensure a processing rate that is appropriate to the production speed of the secondary profiles P2, P3. The first punching press 310 (of greater dimensions and therefore suitable for working at lower processing rates) may be dedicated to processing the main profiles P1, the production speed thereof being lower than the production speed of the secondary profiles P2, P3.

As such, the line 1 for the production of metal profiles for plasterboard false ceilings is capable of producing both types of metal profiles without limiting the production speed of the secondary metal profiles.

The installation configuration adopted renders, furthermore, the production line 1 according to the invention operationally simple to control.

The line 1 for producing metal profiles for plasterboard false ceilings has, finally, implementation costs comparable to those of a traditional production line, since it essentially only provides for the addition of a plurality (for example three) of the second punching presses with a C-support.

The specific configuration of the system 40 for extracting finished metal profiles P1, P2, P3 makes it possible, furthermore, to avoid the impossibility of frontal profile extraction from the punching group due to the presence of the row of second punching presses. The configuration of the system 40 for extracting finished metal profiles P1, P2, P3 does not only avoid this possibility but it also enables rapid and continuous extraction of finished profiles from the punching group 30, preventing the profile extraction operations from interfering with the operation of the presses.

As such, the combination of the above features makes the line 1 for producing metal profiles for plasterboard false ceilings capable of producing both metal profile types without limitations regarding the production speed of the secondary metal profiles and without interference to the punching group due to the profile extraction operations.

Preferably, said profile sliding plane m extends along said extraction direction Y4 at least for all of the extension of said punching group 30. Said extraction direction Y4 at least for all of the width extension of said punching group 30. In other words, the conveyor belt 41 is configured so as to support the metal profiles P1, P2, P3 for the entire width of the profile movement lane 31. The conveyor belt is not necessarily in contact with the profiles for the entire length of the profile movement lane 31 but, as shown in the attached figures, may come in contact with the profiles only at some points of the profile sliding plane m.

Advantageously, as shown in FIG. 2, the extraction system 40 comprises a conveyor means 42 (for example a conveyor belt) which is arranged outside said punching group 30 and is configured to receive the metal profiles P1, P2, P3 extracted from the punching group 30 by means of said conveyor belt 41. In particular, this conveyor means 42 may convey the profiles to a collection area 43.

Advantageously, the first punching press 310 of the portal type is fixed in position and centered in relation to the centerline M-M of the profile movement lane 31.

Figure 7:
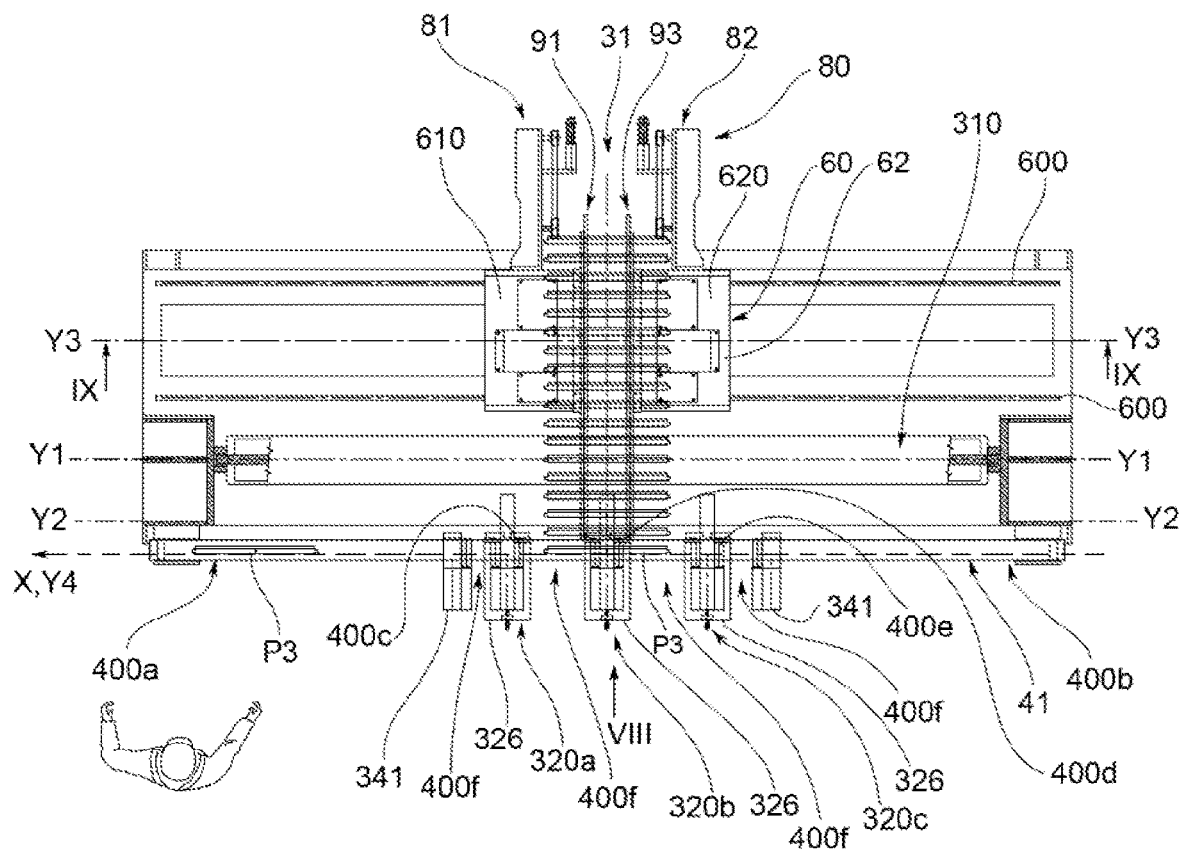
FIG. 7 shows an enlarged view of part of the line of FIG. 2 in relation to a group for the application of coupling terminals and a punching group comprising a first punching press of the portal type and a plurality of punching presses with a rear C-support, which are movable and aligned with each other to form a row, wherein said production line is depicted in an operating configuration that is suitable for the production of secondary metal profiles having a first predefined length.

Preferably, the second punching presses 320a, 320b, 320c are movable parallel to said second operating direction Y2. In this way, it is possible to adapt the position of the second punching presses as a function of the length of the secondary profiles P2, P3 being processed, as may be observed from a comparison of FIG. 7 and FIG. 11. In particular, as shown in FIG. 7, it is also possible that for some types of secondary profiles the operation of only one part of the second punching presses is required.

Advantageously, said second punching presses 320a, 320b, 320c are mounted on motorized carriages 326 sliding on guides 327 parallel to said second operating direction Y2. Said management and control unit 50 is configured so as to operate in use said motorized carriages 326 so as to adjust the pitch of the second punching presses 320 a, 320b, 320c along said second operating direction Y2 as a function of the type or length of the metal profiles P2, P3 in output from the cutting group 20.

According to a preferred embodiment of the present invention, shown in the attached figures, said conveyor belt 41 is configured so as to follow a path deviated from said profile sliding plane m at each of said combs 91, 92, 93, allowing said conveyor belt 41 to by-pass laterally and inferiorly each of said combs 91, 92, 93. Such a configuration is visible in particular in FIGS. 4, 8 and 12.

Figure 4:
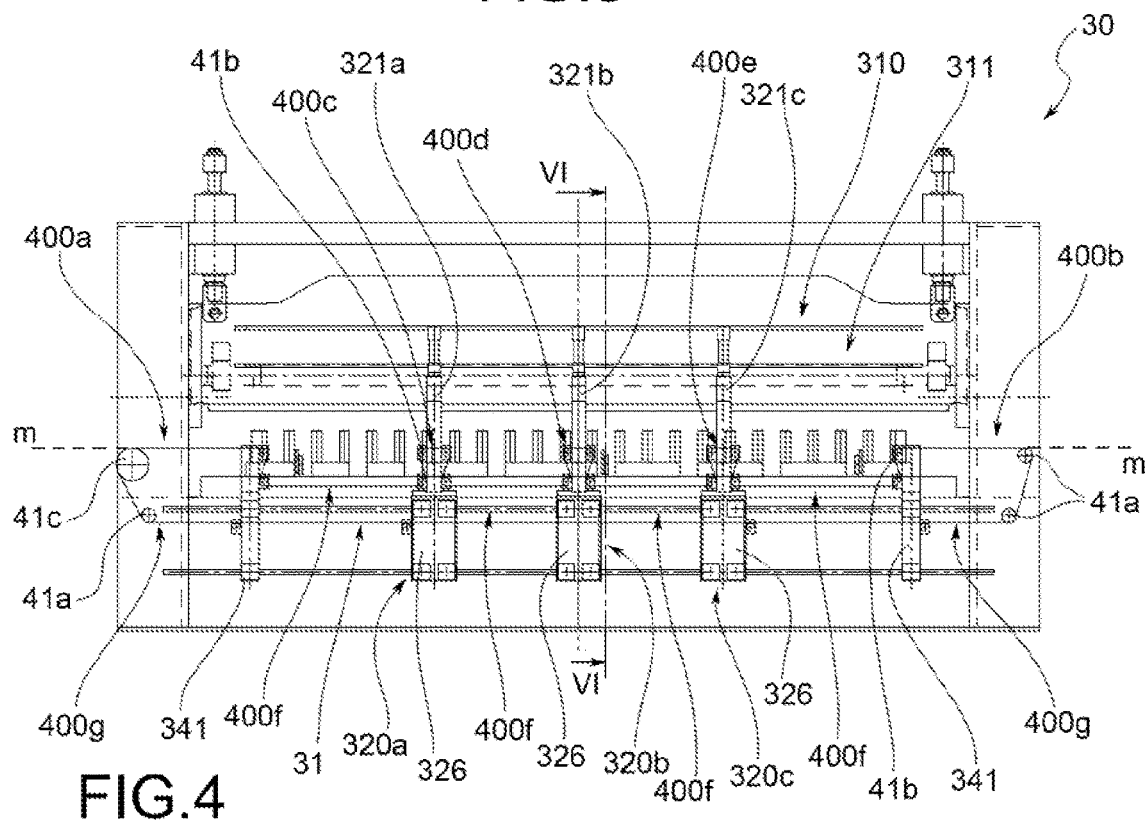
FIG. 4 shows an orthogonal elevation view of the group for the application of coupling terminals and of the punching group depicted in FIG. 3, said view being according to the arrow IV shown therein, where the first press is depicted as being equipped with the relative dies.
Figure 5:
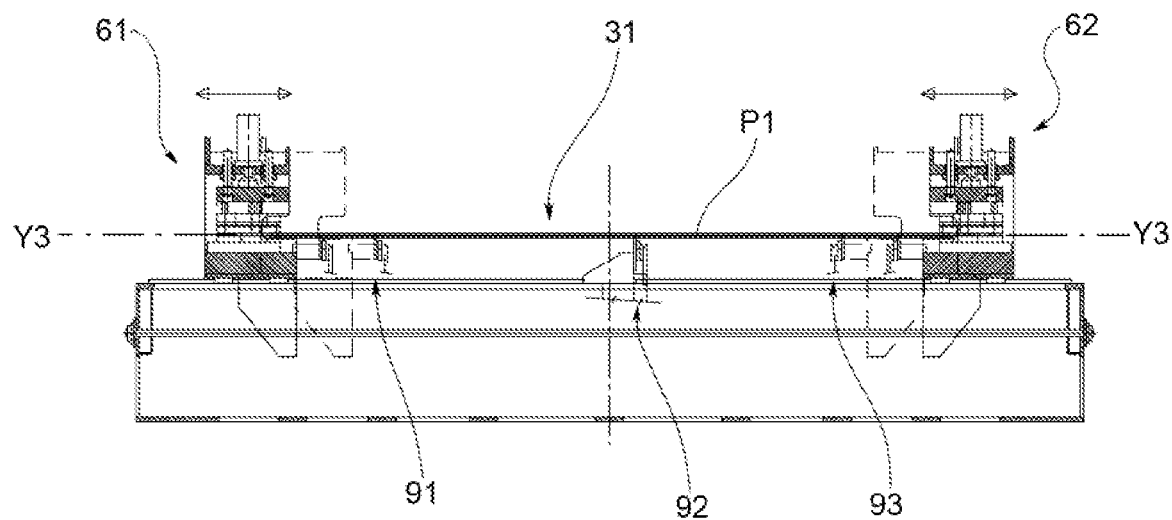
FIG. 5 shows a cross-section orthogonal elevation view of the group for the application of coupling terminals depicted in FIG. 3, said view being according to the cross-section line V-V shown therein.
Figure 8:
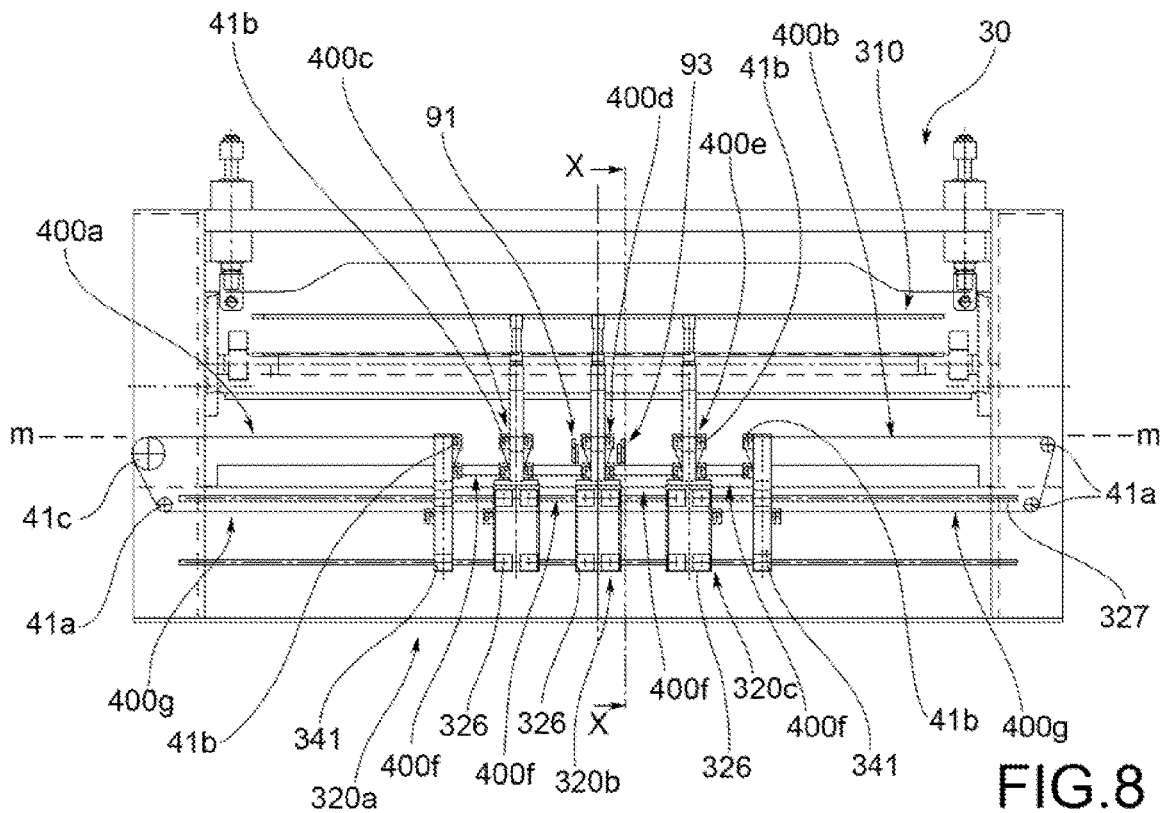
FIG. 8 shows an orthogonal elevation view of the punching group shown in FIG. 7, wherein said view is according to the arrow VIII shown therein, where the first press is shown as being devoid of the relative dies.
Figure 9:
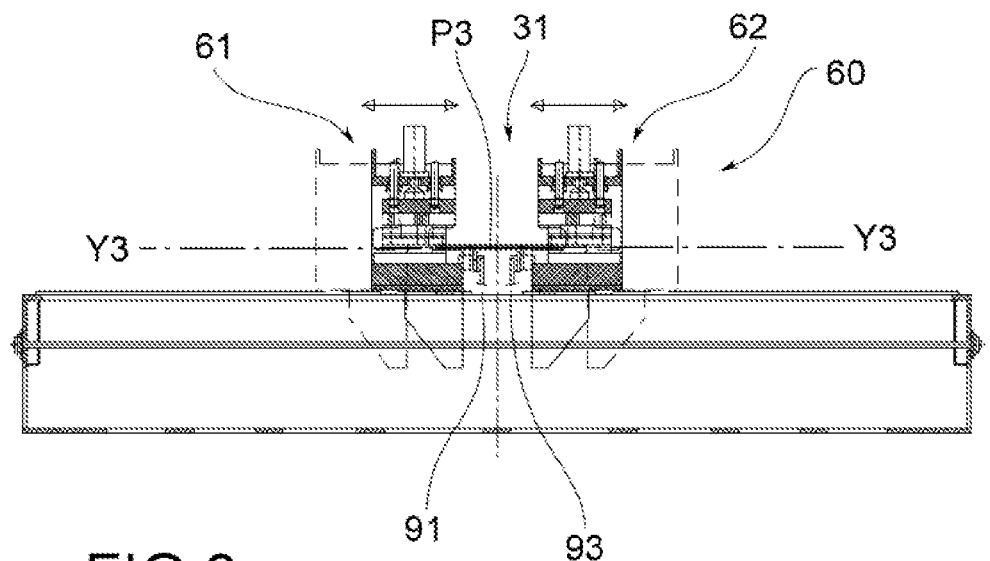
FIG. 9 shows a cross-section orthogonal elevation view of the group for the application of coupling terminals depicted in FIG. 7, said view being according to the cross-section line IX-IX shown therein.
Figure 12:
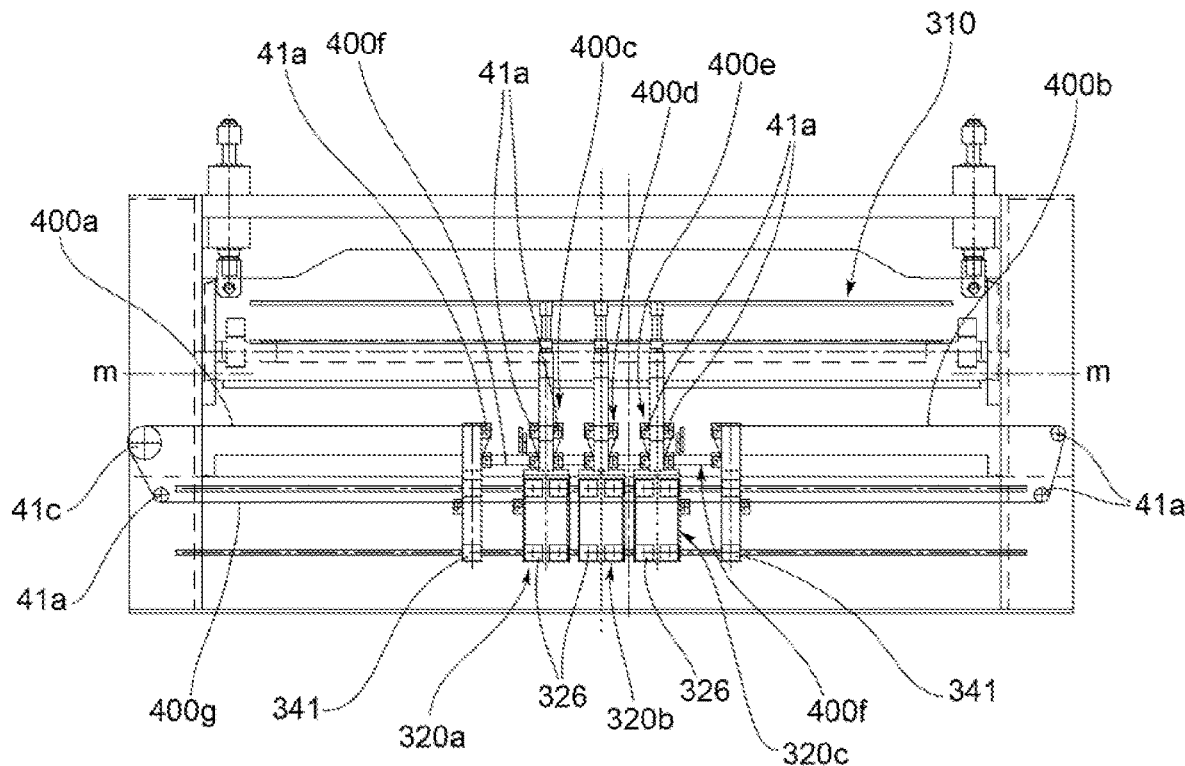
FIG. 12 shows an orthogonal elevation view of the punching group shown in FIG. 11, wherein said view is according to the arrow XII shown therein, where the first press is depicted as being devoid of the relative dies.

Advantageously, as shown in particular in FIGS. 4, 8 and 12, said conveyor belt 41 comprises a plurality of return rollers 410a, 410b. In more detail, the conveyor belt 41 is additionally also equipped with a motorized movement roller 41c.

Some of said return rollers, indicated in FIG. 41b, are movable in parallel to said extraction direction Y4. Operationally, said management and control unit 50 is configured to operate in use movement means 326, 341 for moving said return rollers 410b so as to adjust the position thereof parallel to said second operating direction Y2 as a function of the position of said combs 91, 92, 93 defined by the type or length of the metal profiles P1, P2, P3 in output from the cutting group 20, as well as the location of the second punching presses.

Advantageously, the movable return rollers 410b are installed on motorized carriages 326, 341 slidable on guides 327 parallel to said second operating direction Y2. Said motorized carriages 326, 341 (with the relative guides 327) constitute said movement means. Preferably, the guides whereupon the motorized carriages of the return rollers run are the same guides as for the second punching presses.

Advantageously, part of the return rollers 410b is arranged around each of said second punching presses 320a, 320b, 320c so that the conveyor belt 41 defines a direct contact zone with the profiles on said profile sliding plane m at least at said second punching presses.

Preferably, those return rollers 410b that are arranged around said second punching presses are mounted on board the respective second punching presses so as to be integral therewith in the movement along said second operating direction Y2. Advantageously, for these return rollers, the motorized carriages 326 of said second punching presses also constitute the motorized carriages of said return rollers. Otherwise, the movable return rollers that are not arranged in proximity to said second punching presses are installed on separate motorized carriages that are indicated in the figures with the numeral 341.

In particular, as shown in FIGS. 4, 8 and 12, the conveyor belt 41 defines at least two direct contact zones 400a, 400b arranged in positions opposite to one another in relation to the extraction direction Y4 and direct contact zones 400c, 400d, 400e arranged at the second punching presses. The direct contact zones 400a, 40b, 400c, 400d, 400e are interspersed with areas of deviation 400f from the profile sliding plane m. The conveyor belt 41 path closes at the bottom with the section 400g which extends for the entire width of the profile movement lane 31.

Advantageously, the movability of the return rollers 41b parallel to the second operating direction Y2 makes it possible to easily and quickly coordinate the position of the return rollers in relation to the combs of the profile movement device 90, thereby avoiding any possible interference therebetween.

As previously highlighted, the main profiles produced by line 1 differ from one another—depending upon the length thereof—into main metal profiles P1 and secondary metal profiles P2, P3.

Preferably, the elongated punching head 311 of said first punching press 310 is sized in length so as to work over the entire length of the main metal profiles P1.

Preferably, the punching head 321a, 321b, 321c of each of said second punching presses 320a, 320b, 320c is sized in length to work over a portion of the secondary metal profiles P2, P3.

Advantageously, the first punching press 310 may be equipped with punching dies that differ in type and/or number with respect to the punching dies with which said second punching presses 320a, 320b, 320c are equipped.

Preferably, the first punching press 310 is equipped with punching dies 312 for the main metal profiles P1, while said second punching presses 320a, 320b, 320c are equipped with punching dies 322 for the secondary metal profiles P2, P3.

In particular, the first punching press 310 is sized to process at most from 25 to 30 pieces/minute, whilst each of said second punching presses 320a, 320b, 320c is sized to process a maximum of 40 to 45 pieces/minute.

The present invention allows numerous advantages to be obtained, which have already been described in part.

The line 1 for the production of metal profiles for plasterboard false ceilings is capable of producing both types of metal profiles without limiting the production speed of the secondary metal profiles.

The installation configuration adopted renders, furthermore, the production line 1 according to the invention operationally simple to control.

The line 1 for producing metal profiles for plasterboard false ceilings has, finally, implementation costs comparable to those of a traditional production line, since it essentially only provides for the addition of one additional press.

The invention thus conceived therefore achieves its intended objectives.

Obviously, in practice it may also assume different forms and configurations from the one illustrated above, without thereby departing from the present scope of protection.

Furthermore, all details may be replaced with technically equivalent elements, and the dimensions, shapes, and materials used may be any according to the needs.

What is claimed is:

1. A line for producing metal profiles for plasterboard false ceilings, the line comprising in sequence along a profile advancement direction:
    a profiling machine suitable to profile a metal strip to obtain a continuous metal profile;
    a cutting group placed downstream of the profiling machine and suitable to cut said continuous metal profile into pieces of predefined lengths which constitute said metal profiles for plasterboard false ceilings;
    a punching group placed downstream of the cutting group and is suitable to make holes on each metal profile along a longitudinal extension of the metal profile;
    an extraction system for extracting finished metal profiles from the punching group,
    a management and control unit suitable to control at least said cutting group and said punching group,
    wherein said punching group comprises:
    a first punching press of the portal type having an elongated punching head along a first operating direction; and
    a plurality of second punching presses with a C-support arranged downstream of said first punching press and aligned with each other to form a row along a second operating direction parallel to the first operating direction,
    each of said second punching presses having a respective punching head extending in length along the second operating direction for a fraction of a length of the elongated punching head of said first punching press, said management and control unit being configured to alternately operate in use said first punching press and at least one part of said second punching presses as a function of type or length of the metal profiles in output from the cutting group,
    wherein in each of said second punching presses the C-support comprises a support base and an arm extending cantilevered from said support base to support at a free end thereof the punching head above an abutment area formed on said support base, a profile unloading area being delimited on said support base between said abutment area and the arm, wherein the profile unloading area is not affected by movement of the punching head, and
    wherein said extraction system is integrated with said second punching presses and comprises a conveyor belt arranged to define a profile sliding plane along an extraction direction that is parallel to said second operating direction and passes through the respective unloading areas of the second punching presses, so as to allow extraction of the metal profiles laterally to said punching group at said second punching presses.

2. The line of claim 1, wherein said second punching presses are movable parallel to said second operating direction.

3. The line of claim 2, wherein said second punching presses are mounted on motorized carriages sliding on guides parallel to said second operating direction, and wherein said management and control unit is configured to operate in use said motorized carriages to adjust a pitch of the second punching presses along said second operating direction as a function of the type or length of the metal profiles in output from the cutting group.

4. The line of claim 1, wherein said profile sliding plane extends along said second extraction direction at least for an entire extension in width of said punching group.

5. The line of claim 1, wherein said extraction system comprises a conveyor means arranged outside said punching group and configured to receive the metal profiles extracted from the punching group by means of said conveyor belt.

6. The line of claim 1, further comprising:
   a conveyor for transferring the metal profiles from said cutting group to said punching group, wherein said conveyor is configured to move the metal profiles parallel to their longitudinal extension direction;
   a profile transfer device suitable to pick up the metal profiles from said conveyor and insert the metal profiles in the punching group so that a longitudinal extension axis of the metal profiles is parallel to the first operating direction and the second operating direction of the punching presses; and
   a profile movement device suitable to make the profiles advance starting from the profile transfer device to the extraction system inside a profile movement lane through the punching group with a direction orthogonal to the longitudinal extension axis of the metal profiles, keeping the metal profiles parallel to said first and second operating directions.

7. The line of claim 6, wherein said profile movement device is defined by a plurality of combs parallel to each other and to the profile advancement direction, arranged inside said profile movement lane, wherein each of said combs extends in length from the profile transfer device up to the extraction system along said profile movement lane and is cyclically movable so as to impart to each metal profile a stepwise advancing movement along said profile movement lane, and wherein preferably the combs are distributed over a width of the profile movement lane and are movable orthogonally to the profile advancement direction so that distribution of the combs within the profile movement lane is adjustable as a function of the type of the metal profiles.

8. The line of claim 7, wherein said conveyor belt is configured to follow a path deviated from said profile sliding plane at each of said combs, allowing said conveyor belt to laterally and inferiorly bypass each of said combs.

9. The line of claim 8, wherein said conveyor belt comprises a plurality of return rollers some of which are movable parallel to said extraction direction, and wherein said management and control unit is configured to operate in use movement means for moving said return rollers so as to adjust a position thereof parallel to said second operating direction as a function of a position of said combs defined by the type or length of the metal profiles in output from the cutting group.

10. The line of claim 9, wherein the movable return rollers are installed on motorized carriages sliding on guides parallel to said second operating direction, preferably the same guides as the second punching presses, said motorized carriages constituting said movement means.

11. The line of claim 9, wherein said second punching presses are mounted on motorized carriages sliding on guides parallel to said second operating direction, and wherein said management and control unit is configured to operate in use said motorized carriages to adjust a pitch of the second punching presses along said second operating direction as a function of the type or length of the metal profiles in output from the cutting group, and wherein a part of the return rollers is arranged around each of said second punching presses so that the conveyor belt defines a direct contact zone with the metal profiles on said profile sliding plane at least at said second punching presses, wherein preferably the return rollers arranged around said second punching presses are mounted on board the respective second punching presses so as to be integral therewith in a movement along said second operating direction, the motorized carriages of said second punching presses forming the motorized carriages of said return rollers as well.

12. The line of claim 1, wherein said metal profiles differ from each other, as a function of their length, in main metal profiles and secondary metal profiles, and wherein the elongated punching head of said first punching press is sized in length to work over an entire length of the main metal profiles.

13. The line of claim 1, wherein said metal profiles differ from each other, as a function of their length, in main metal profiles and secondary metal profiles, and wherein the punching head of each of said second punching presses is sized in length to work over a portion of the secondary metal profiles.

14. The line of claim 1, wherein said first punching press is equipped with punching dies different in type and/or number with respect to the punching dies with which said second punching presses are equipped.

15. The line of claim 14, wherein said first punching press is equipped with punching dies for the main metal profiles, while said second punching presses are equipped with punching dies for the secondary metal profiles.

16. The line of claim 1, wherein said first punching press is sized to process at most from 25 to 30 pieces/min.

17. The line of claim 1, wherein each of said second punching presses is sized to process a maximum of 40 to 45 pieces/min.

18. The line of claim 1, further comprising downstream of the cutting group, and preferably upstream of the punching group, a group for applying coupling terminals suitable to apply coupling terminals to both ends of each of the metal profiles.

19. The line of claim 18, wherein the line further comprises:
   a conveyor for transferring the metal profiles from said cutting group to said punching group, wherein said conveyor is configured to move the metal profiles parallel to their longitudinal extension direction;
   a profile transfer device suitable to pick up the metal profiles from said conveyor and insert the metal profiles in the punching group so that a longitudinal extension axis of the metal profiles is parallel to the first operating direction and the second operating direction of the punching presses; and
   a profile movement device suitable to make the profiles advance starting from the profile transfer device to the extraction system inside a profile movement lane through the punching group with a direction orthogonal to the longitudinal extension axis of the metal profiles, keeping the metal profiles parallel to said first and second operating directions, and wherein said group for applying coupling terminals is placed downstream of the profile transfer device and is integrated with said profile movement device.

20. The line of claim 18, wherein said group for applying coupling terminals comprises two coupling terminal application heads aligned along a coupling terminal application direction parallel to the first operating direction and to the second operating direction, and wherein said two coupling terminal application heads are movable along said coupling terminal application direction to adapt to the length of the metal profiles to be processed.

21. The line of claim 20, wherein said two coupling terminal application heads are mounted on motorized carriages sliding on guides parallel to said coupling terminal application direction, and wherein said management and control unit is configured to operate in use said motorized carriages to adjust a position of said two coupling terminal application heads along said coupling terminal application direction as a function of the type or length of the metal profiles in output from the cutting group.

* * * * *